US008655621B2

(12) United States Patent
Whitefield, II

(10) Patent No.: US 8,655,621 B2
(45) Date of Patent: Feb. 18, 2014

(54) SYSTEMS AND METHODS FOR USE IN MONITORING OPERATION OF A ROTATING DEVICE

(75) Inventor: Charles David Whitefield, II, Carson City, NV (US)

(73) Assignee: General Electric Company, Schenectady, NY (US)

(*) Notice: Subject to any disclaimer, the term of this patent is extended or adjusted under 35 U.S.C. 154(b) by 351 days.

(21) Appl. No.: 13/165,608

(22) Filed: Jun. 21, 2011

(65) Prior Publication Data

US 2012/0330606 A1 Dec. 27, 2012

(51) Int. Cl.
*G06F 19/00* (2011.01)

(52) U.S. Cl.
USPC .......... 702/151

(58) Field of Classification Search
USPC .......... 702/151
See application file for complete search history.

(56) References Cited

U.S. PATENT DOCUMENTS 4,307,393 A 12/1981 Hamada et al.
4,847,785 A 7/1989 Stephens
5,347,289 A * 9/1994 Elhardt .......... 342/448
5,365,254 A 11/1994 Kawamoto
5,898,307 A 4/1999 Taraki et al.
6,421,571 B1 7/2002 Spriggs et al.
6,668,253 B1 12/2003 Thompson et al.
6,775,576 B2 8/2004 Spriggs et al.
7,420,562 B2 9/2008 Shinohara et al.
7,511,711 B2 * 3/2009 Ing et al. .......... 345/424
7,606,673 B2 10/2009 Judd
7,606,681 B2 10/2009 Esmaili et al.
7,925,392 B2 * 4/2011 Altieri et al. .......... 701/3
2007/0109301 A1 5/2007 Smith
2011/0125461 A1 5/2011 Smith et al.
2012/0330604 A1 * 12/2012 Whitefield, II .......... 702/151
2012/0330605 A1 * 12/2012 Whitefield, II .......... 702/151

FOREIGN PATENT DOCUMENTS

DE 3044440 A1 6/1982
DE 4317401 A1 12/1994
JP 2010266329 A 11/2010

OTHER PUBLICATIONS

Search Report from DK Application No. PA201270330 dated Jan. 28, 2013.

* cited by examiner

*Primary Examiner* — Bryan Bui
(74) *Attorney, Agent, or Firm* — Fletcher Yoder, P.C.

(57) ABSTRACT

A system for use in monitoring operation of a rotating device includes at least one sensor configured to sense a position of a component coupled to a rotating device with respect to a predefined axis and generate a signal indicative of the component position. A processor is programmed to calculate a plurality of property values of the component based at least partially on the position, and graphically present at least one time-based waveform based on at least a portion of the component property values. The processor is also programmed to graphically present at least one orbit plot based on at least a portion of the plurality of component property values, and synchronize the time-based waveform with the orbit plot. The time-based waveform is indicative of a position of the component along the axis, and the orbit plot is indicative of a position of the component within a predefined plane.

25 Claims, 5 Drawing Sheets

100 130 132 124 126 104 106 134 108 122 110 112 114 116 102 128 136 120 118

100
130
132
124
134
106
104
128
136
126
122
114
116
108
102
120
110
118
112

SYSTEMS AND METHODS FOR USE IN MONITORING OPERATION OF A ROTATING DEVICE

BACKGROUND OF THE INVENTION

The subject matter disclosed herein relates generally to monitoring systems and, more specifically, to systems and methods for use in monitoring operation of a rotating device.

Known machines may exhibit vibrations or other behavior during operation. Sensors may be used to measure such behavior and to determine, for example, an amount of vibration exhibited in a motor drive shaft, a rotational position or displacement of the motor drive shaft, and/or other suitable operational characteristics of a machine or motor. Often, the sensors are coupled to a monitoring system that includes a plurality of monitors and at least one processor. The monitoring system receives signals that are representative of measurements sensed from the sensors, and transmits those measurements to a diagnostic platform that displays the measurements in a form usable by a user.

However, at least some known diagnostic platforms may have limited space in which to display measurements received from sensors. Accordingly, at any one time, known diagnostic systems may only be able to display a subset of desired measurement data to a technician or a user. As such, the technician or user may not be able to easily and/or quickly diagnose operational faults and/or errors within a machine. Such difficulty and/or delay in diagnosing faults and/or errors may result in damage occurring to the machine and/or may undesirably result in the machine becoming unusable for a period of time.

BRIEF DESCRIPTION OF THE INVENTION

In one embodiment, a system for use in monitoring operation of a rotating device is provided. The system includes at least one sensor configured to sense a position of a component coupled to the rotating device with respect to a predefined axis and to generate a signal indicative of the position of the component, and a processor coupled to the at least one sensor. The processor is programmed to calculate a plurality of property values of the component based at least in part on the position, and graphically present at least one time-based waveform based on at least a portion of the plurality of component property values, wherein the at least one time-based waveform is indicative of a position of the component along a predefined axis. The processor is also programmed to graphically present at least one orbit plot based on at least a portion of the plurality of component property values, wherein the at least one orbit plot is indicative of a position of the component within a predefined plane, and synchronize the at least one time-based waveform with the at least one orbit plot.

In another embodiment, a computer-readable storage medium is provided having computer executable instructions embodied thereon, wherein when executed by a processor, the computer-executable instructions cause the processor to receive a signal indicative of a position of a component coupled to a rotating device with respect to a predefined axis and calculate a plurality of property values of the component based at least in part on the position. The processor is also caused to graphically present at least one time-based waveform based on at least a portion of the plurality of component property values, graphically present at least one orbit plot based on at least a portion of the plurality of component property values, and synchronize the at least one time-based waveform with the at least one orbit plot. The at least one time-based waveform is indicative of a position of the component along the predefined axis, and the at least one orbit plot is indicative of a position of the component within a predefined plane.

In yet another embodiment, a method of monitoring operation of a rotating device including a component is provided that includes receiving a signal indicative of a position of the component with respect to a predefined axis and calculating a plurality of property values of the component based at least in part on the position. The method also includes graphically presenting at least one time-based waveform based on at least a portion of the plurality of component property values, graphically presenting at least one orbit plot based on at least a portion of the plurality of component property values, and synchronizing the at least one time-based waveform with the at least one orbit plot. The at least one time-based waveform is indicative of a position of the component along the predefined axis, and the at least one orbit plot is indicative of a position of the component within a predefined plane.

DETAILED DESCRIPTION OF THE INVENTION

Figure 1:
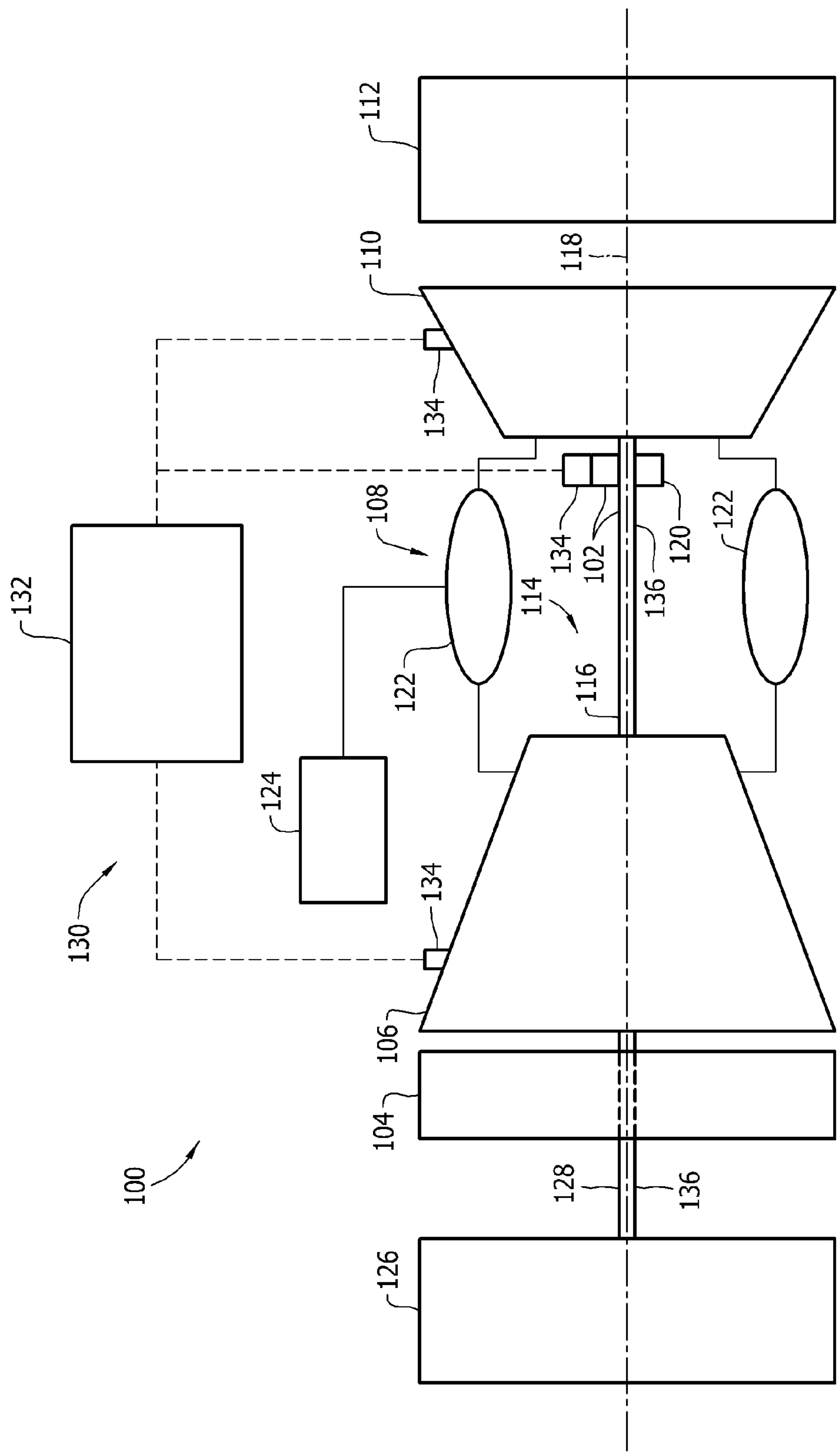
FIG. 1 is a schematic illustration of an exemplary rotating device.
Figure 2:
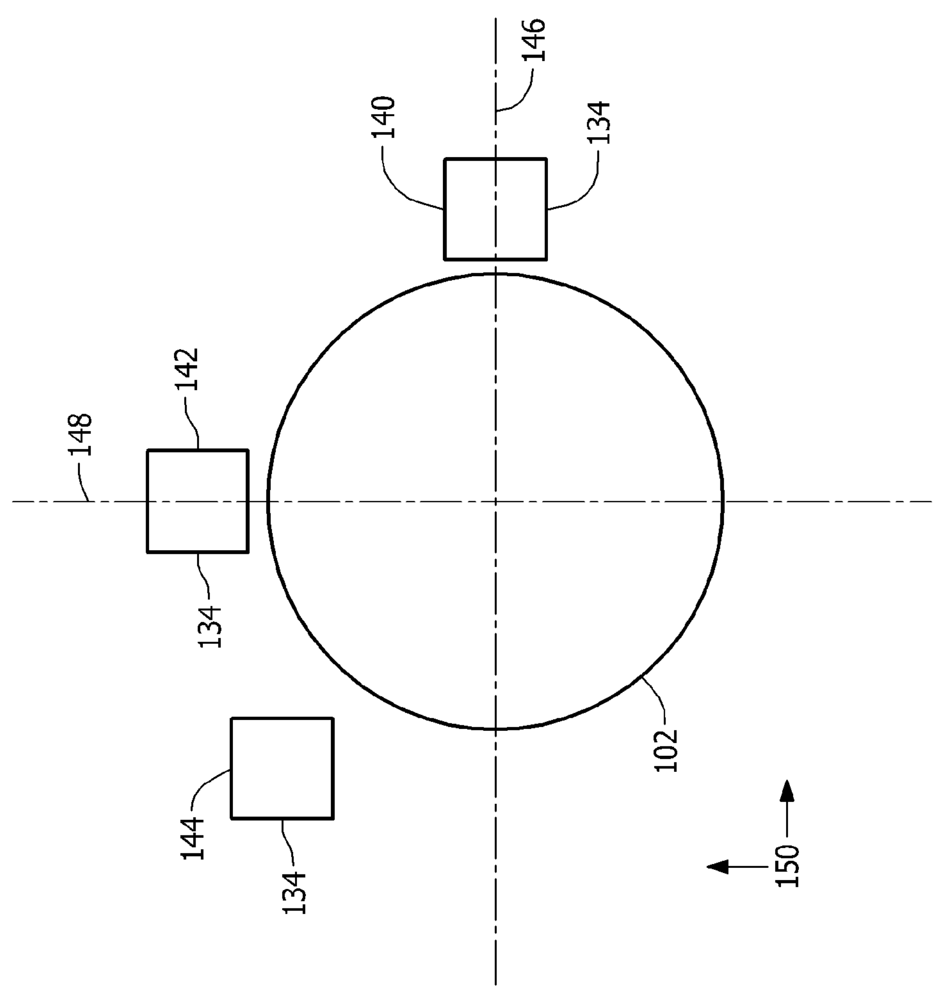
FIG. 2 is a cross-sectional view of a component of the rotating device shown in FIG. 1.

FIG. 1 is a schematic view of an exemplary rotating device 100. FIG. 2 is a cross-sectional view of a component 102 used within rotating device 100. In the exemplary embodiment, rotating device 100 is a turbine engine system 100 that includes an intake section 104, a compressor section 106 coupled downstream from intake section 104, a combustor section 108 coupled downstream from compressor section 106, a turbine section 110 coupled downstream from combustor section 108, and an exhaust section 112. A rotor shaft assembly 114 is coupled to turbine section 110 and compressor section 106 and includes a drive shaft 116 that extends between turbine section 110 and compressor section 106 along a centerline axis 118. At least one support element, such as at least one bearing 120, rotatably supports drive shaft 116. Combustor section 108 includes a plurality of combustors 122. Combustor section 108 is coupled to compressor section 106 such that each combustor 122 is in flow communication with compressor section 106.

A fuel assembly 124 is coupled to each combustor 122 to provide a flow of fuel to combustor 122. Turbine section 110 is rotatably coupled to compressor section 106 and to an electrical generator 126 via drive shaft 116. Compressor section 106 and turbine section 110 each include at least one rotor blade or compressor blade (not shown) that is coupled to rotor shaft assembly 114. Rotor shaft assembly 114 includes a rotor shaft 128 that is coupled to generator 126 and that imparts a power loading to generator 126 during operation of rotating device 100. Generator 126 is coupled to a power source, such as for example, an electric utility grid (not shown) for distributing electrical power to the utility grid. Alternatively, rotating device 100 may have other configurations and use other types of components. For example, rotating device 100 may be or may include at least one gas turbine engine, another type of turbine and/or machine, and/or another type of power generation equipment that enables rotating device 100 to function as described herein.

In the exemplary embodiment, a monitoring system 130 includes a computing device 132 and a plurality of sensors 134 coupled to computing device 132. Moreover, in the exemplary embodiment, sensors 134 are coupled to, or are positioned proximate to, at least one component 102 of rotating device 100, such as at least one segment 136 of drive shaft 116 and/or of rotor shaft 128. Alternatively or additionally, sensors 134 may be coupled to, or positioned proximate to, another component 102 such as, but not limited to, bearing 120.

Sensors 134, in the exemplary embodiment, include a first vibration or proximity sensor 140, a second vibration or proximity sensor 142, and a rotation sensor 144. Alternatively, sensors 134 may include any other type and/or number of sensors that enables monitoring system 130 to function as described herein. In the exemplary embodiment, first proximity sensor 140 is positioned in close proximity to component 102 to detect a position and/or a proximity of component 102 along a first axis, or X-axis 146, relative to sensor 140. Second proximity sensor 142 is positioned in close proximity to component 102 to detect a position and/or a proximity of component 102 along a second axis, or Y-axis 148, relative to sensor 142. While FIG. 2 illustrates X-axis 146 oriented along a horizontal axis, and Y-axis 148 oriented along a vertical axis, it should be recognized that X-axis 146 and/or Y-axis 148 may be oriented along any suitable axis to enable monitoring system 130 to function as described herein. In the exemplary embodiment, X-axis 146 and Y-axis 148 are perpendicular to each other and each is perpendicular to centerline axis 118. First proximity sensor 140 and second proximity sensor 142 work in combination to detect a position of component 102 within a two-dimensional Cartesian reference plane 150, or X-Y plane 150, that is perpendicular to centerline axis 118. First proximity sensor 140 and second proximity sensor 142 transmit signals representative of the detected position of component 102 to computing device 132.

In the exemplary embodiment, sensor 144 detects a rotation of component 102. More specifically, in the exemplary embodiment, rotation sensor 144 detects an indicia coupled to, or part of, component 102 that may include, but is not limited to only including, a magnetic strip, a material that is different than a material of component 102, and/or a predefined mark or a notch (not shown) on component 102 during each revolution of component 102, or during a predefined portion of a revolution of component 102, as the mark or notch rotates past sensor 144. In the exemplary embodiment, sensor 144 transmits a signal representative of the detection of the mark or notch to computing device 132 to enable a rotational frequency of component 102 to be determined. Moreover, in the exemplary embodiment, each sensor 134 is synchronously sampled such that computing device 132 receives measurements from each sensor 134 at substantially the same time to facilitate synchronizing a display of data received from each sensor 134.

During operation, intake section 104 channels air towards compressor section 106. Compressor section 106 compresses the inlet air to a higher pressure and temperature and discharges the compressed air towards combustor section 108. Fuel is channeled from fuel assembly 124 to each combustor 122 wherein the fuel is mixed with the compressed air and ignited in combustor section 108. Combustor section 108 channels combustion gases to turbine section 110 wherein gas stream thermal energy is converted to mechanical rotational energy to drive compressor section 106 and/or generator 126 via drive shaft 116. Exhaust gases exit turbine section 110 and flow through exhaust section 112 to ambient atmosphere.

Monitoring system 130 monitors at least one condition of rotating device 100 and/or component 102. More specifically, in the exemplary embodiment, first proximity sensor 140 senses a position of component 102 along X-axis 146 and second proximity sensor 142 senses a position of component 102 along Y-axis 148. Rotation sensor 144 senses a rotation of component 102. Each sensor 134 transmits a respective measurement signal to computing device 132 for processing and/or display, as is described more fully below. For example, in the exemplary embodiment, the sensed position of component 102 along X-axis 146 may be used to determine and/or display a movement or a vibration of component 102 with respect to first proximity sensor 140, and the sensed position of component 102 along Y-axis 148 may be used to determine and/or display a movement or a vibration of component 102 with respect to second proximity sensor 142.

Figure 3:
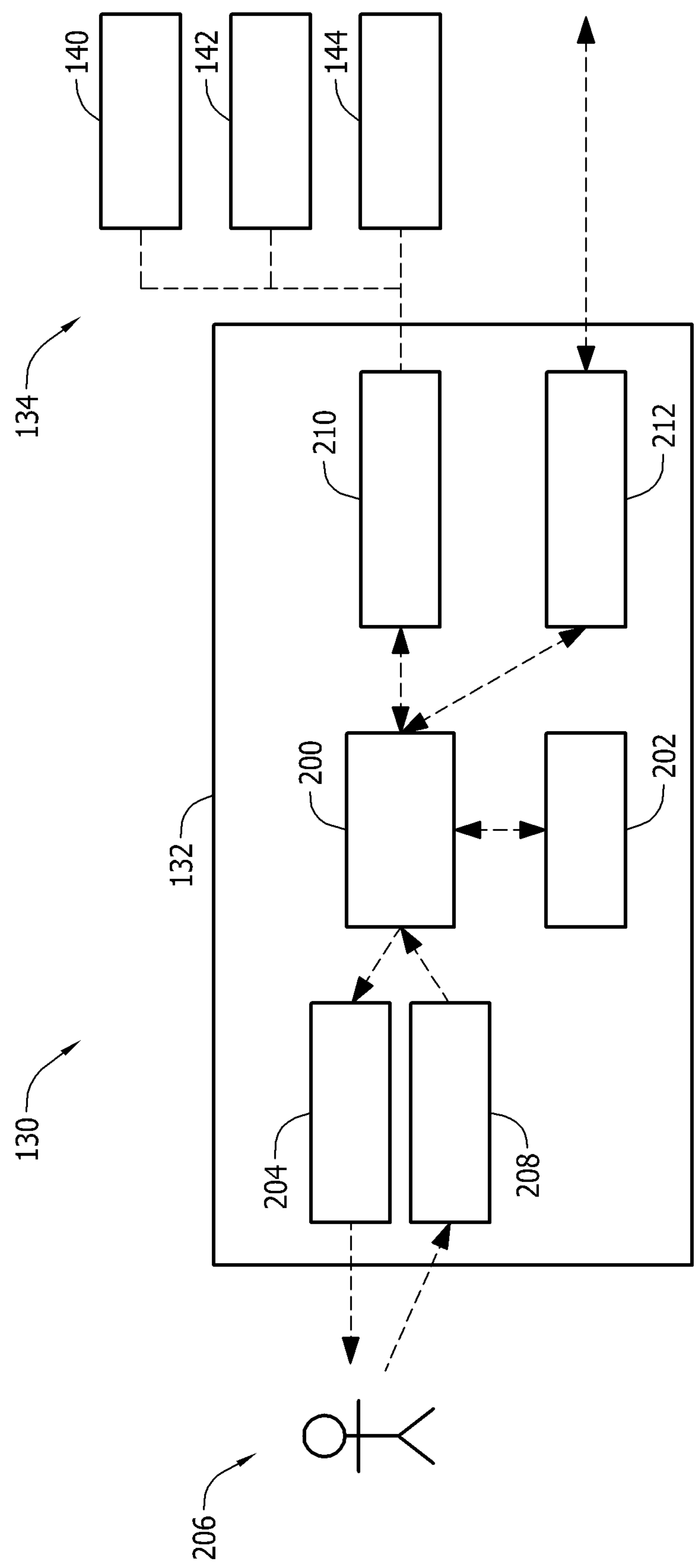
FIG. 3 is a block diagram of an exemplary monitoring system that may be used with the rotating device shown in FIG. 1.

FIG. 3 is a block diagram of an exemplary monitoring system 130 that may be used with rotating device 100 (shown in FIG. 1). In the exemplary embodiment, monitoring system 130 includes a computing device 132 that is coupled in communication with sensors 134. More specifically, monitoring system 130 includes first proximity sensor 140, second proximity sensor 142, and rotation sensor 144 coupled to computing device 132.

In the exemplary embodiment, computing device 132 includes a processor 200 that is coupled in communication with a memory device 202 for executing programmed instructions. In the exemplary embodiment, executable instructions are stored in memory device 202. Alternatively, executable instructions may be retrieved from another device via a computer network. In the exemplary embodiment, computing device 132 is programmable to perform one or more operations described herein by programming processor 200. For example, processor 200 may be programmed by encoding an operation as one or more executable instructions and providing the executable instructions in memory device 202. Moreover, in one embodiment, processor 200 may include one or more processing units (e.g., in a multi-core configuration).

Processor 200 may include, but is not limited to only including, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The above examples are exemplary only, and thus are not intended to limit in any way the definition and/or meaning of the term processor.

In the exemplary embodiment, memory device 202 is one or more devices that enable information, such as executable instructions and/or other data, to be selectively stored and retrieved. Memory device 202 includes one or more computer readable media, such as, without limitation, dynamic random access memory (DRAM), static random access memory (SRAM), a solid state disk, and/or a hard disk. Memory device 202 may be configured to store, without limitation, executable instructions and/or any other type of data suitable for use with the methods described herein.

In the exemplary embodiment, computing device 132 includes a presentation interface 204 that is coupled to processor 200. Presentation interface 204 is configured to output (e.g., display, print, and/or otherwise output) information, such as, but not limited to, a plurality of component property values and/or traces (not shown in FIG. 3) to a user 206. For example, presentation interface 204 may include a display adapter (not shown in FIG. 2) that is coupled to a display device, such as a cathode ray tube (CRT), a liquid crystal display (LCD), an organic light-emitting diode (OLED) display, and/or an "electronic ink" display. In one embodiment, presentation interface 204 includes more than one display device.

Computing device 132, in the exemplary embodiment, includes an input interface 208 that receives input from user 206. For example, input interface 208 may receive a selection of a movement of a marker (not shown in FIG. 3) displayed by presentation interface 204, and/or may receive any other information suitable for use with the methods and systems described herein. In the exemplary embodiment, input interface 208 is coupled to processor 200 and may include, for example, a keyboard, a selector knob, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 204 and as input interface 208.

In the exemplary embodiment, computing device 132 also includes a sensor interface 210 that is coupled to at least one sensor 134. Each sensor 134 transmits a signal corresponding to a detected condition of component 102, such as a detected position and/or rotational frequency of component 102. Each sensor 134 may transmit a signal continuously, periodically, or only once, and/or at any other signal timing that enables computing device 132 to function as described herein. Moreover, each sensor 134 may transmit a signal either in an analog form or in a digital form.

Computing device 132 includes a communication interface 212 coupled to processor 200. Communication interface 212 is coupled in communication with a remote device, such as a server, a computer, and/or another computing device 132. For example, communication interface 212 may include, without limitation, a wired network adapter, a wireless network adapter, and/or a mobile telecommunications adapter.

Figure 4:
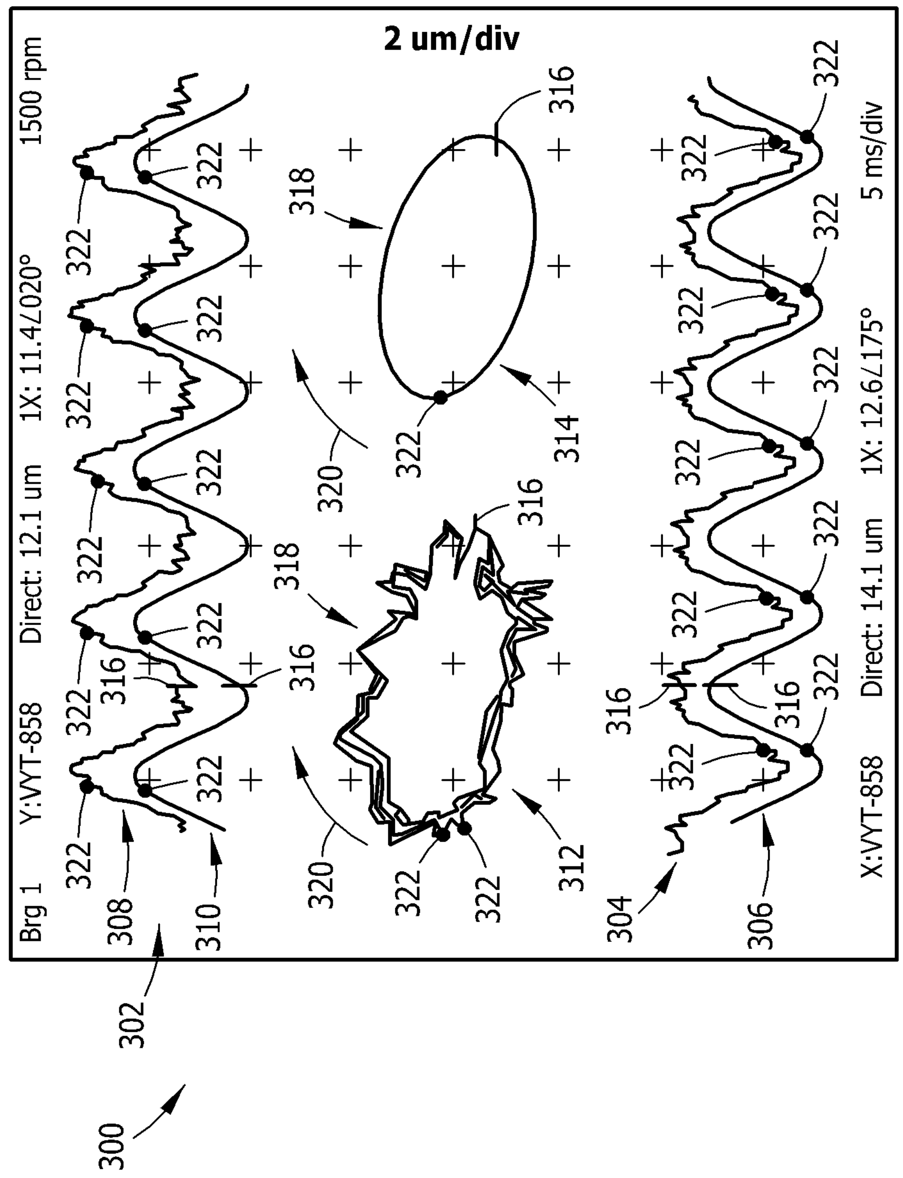
FIG. 4 is a graphical view of an exemplary display that may be used with the monitoring system shown in FIG. 3.

FIG. 4 is a graphical view of an exemplary display 300 that may be generated by monitoring system 130 (shown in FIG. 1). More specifically, in the exemplary embodiment, display 300 is presented and/or generated by computing device 132 (shown in FIG. 1), e.g., via processor 200 and/or presentation interface 204 (both shown in FIG. 3). Moreover, display 300 may be updated by input (e.g., selections and/or entries) received via input interface 208 (shown in FIG. 3). In an alternative embodiment, one or more inputs are received via communication interface 212 (shown in FIG. 3). For example, a selection may be received via an input interface 208 of a remote computing device 132 and may be transmitted by a communication interface 212 of remote computing device 132. In another embodiment, display 300 is displayed on a remote device, such as a personal data assistant (PDA), a smart phone, a tablet computer, and/or another device coupled to computing device 132, for example, via communication interface 212.

In the exemplary embodiment, monitoring system 130 receives signals representative of measured conditions of component 102 (shown in FIG. 2) from sensors 134 (shown in FIG. 1). Processor 200 calculates or determines a plurality of properties of component 102 (shown in FIG. 1) (hereinafter referred to as "component properties") monitored by monitoring system 130 based on the signals received. Moreover, processor 200 converts the signals into a plurality of values representative of component properties (hereinafter referred to as "component property values") and/or other conditions of component 102 and/or rotating device 100, and stores the values in memory device 202. In the exemplary embodiment, component properties and/or component property values may include, but are not limited to only including, a vibration amplitude along X-axis 146, a vibration amplitude along Y-axis 148, a vibration amplitude within X-Y plane 150, a rotational speed or frequency of component 102, a phase of component 102, and/or any other property or condition of component 102 that enables monitoring system 130 to function as described herein.

In the exemplary embodiment, processor 200 transmits at least a portion or subset of the component property values to presentation interface 204, and presentation interface 204 generates display 300 for use in graphically presenting the component property values to user 206 (shown in FIG. 3). In the exemplary embodiment, processor 200 and/or presentation interface 204 displays the component property values substantially in real-time via display 300. As used herein, the term "real-time" refers to receiving and/or displaying data substantially immediately after the data has been generated, disregarding a time required to transmit and/or process the data. Alternatively, processor 200 may retrieve the component property values from memory device 202 and processor 200 and/or presentation interface 204 may display the component property values at a time after the values have been generated and/or stored.

In the exemplary embodiment, processor 200 and/or presentation interface 204 displays a plurality of traces 302, such as a plurality of time-based waveforms and a plurality of orbit plots, on display 300. As described more fully below, the time-based waveforms graphically illustrate direct and/or filtered values of at least one component property, such as an amplitude of vibration along an axis, with respect to time. The orbit plots graphically illustrate direct and/or filtered values of at least one component property, such as an amplitude or a shape of vibration with respect to a plane and with respect to a period of revolution of component 102. More specifically, in the exemplary embodiment, the time-based waveforms include an X-axis direct waveform 304, an X-axis filtered waveform 306, a Y-axis direct waveform 308, and a Y-axis filtered waveform 310. The orbit plots include a direct orbit plot 312 and a filtered orbit plot 314. Alternatively, traces 302 may include any other time-based waveform and/or orbit plot that enables monitoring system 130 to function as described herein. Moreover, in the exemplary embodiment, each trace 302 is synchronized with each other trace 302. As used herein, the term "synchronize" refers to a display of a marker 316 or another location indicator on each trace 302 such that a change of a location of marker 316 on one trace 302 is automatically reflected in a similar change of a location of marker 316 on each other trace 302.

X-axis direct waveform 304 and X-axis filtered waveform 306, in the exemplary embodiment, illustrate the position of component 102 along X-axis 146 over time. The position of component 102 along X-axis 146 corresponds to a vibration amplitude of component 102 along X-axis 146. More specifically, X-axis direct waveform 304 illustrates an unfiltered amplitude of vibration of component 102 over time. The vibration amplitude is calculated by processor 200 from the proximity measurement data received from at least one sensor 134, such as first proximity sensor 140 (shown in FIG. 2).

In the exemplary embodiment, X-axis filtered waveform 306 illustrates a filtered amplitude of vibration of component 102 over time. The filtered vibration amplitude is calculated by processor 200 from the proximity measurement data received from at least one sensor 134, such as first proximity sensor 140, after the data has been processed by a filter (not shown). The filter may be a low-pass filter, a high-pass filter, and/or a bandpass filter with a center frequency about, for example, a rotational frequency of component 102 and/or of rotating device 100. Alternatively, the filter may be any other filter that enables monitoring system 130 and/or display 300 to function as described herein. As such, in the exemplary embodiment, the filter removes undesired frequency components from the signals received from sensors 134 such that the amplitude of the vibration of component 102 may be isolated and/or may be more easily viewed.

In a similar manner, Y-axis direct waveform 308 and Y-axis filtered waveform 310, in the exemplary embodiment, illustrate the position of component 102 along Y-axis 148 over time. The position of component 102 along Y-axis 148 corresponds to a vibration amplitude of component 102 along Y-axis 148. Y-axis direct waveform 308 and Y-axis filtered waveform 310 are calculated and/or generated by processor 200 using data received from at least one sensor 134, such as second proximity sensor 142 (shown in FIG. 2). In other respects, Y-axis direct waveform 308 and Y-axis filtered waveform 310 are generated as described above with respect to X-axis direct waveform 304 and X-axis filtered waveform 306.

In the exemplary embodiment, direct orbit plot 312 and filtered orbit plot 314 illustrate the position and/or the vibration of component 102 within X-Y plane 150 (shown in FIG. 2) over time. More specifically, direct orbit plot 312 illustrates an unfiltered vibration amplitude and/or position of component 102 over time with respect to X-Y plane 150. The vibration amplitude and/or position of component 102 within X-Y plane 150 is calculated by processor 200 from the proximity measurement data received from a plurality of sensors 134, such as first proximity sensor 140 and second proximity sensor 142. Moreover, in the exemplary embodiment, filtered orbit plot 314 illustrates a filtered vibration amplitude and/or position of component 102 over time with respect to X-Y plane 150. The filtered vibration amplitude and/or position of component 102 within X-Y plane 150 is calculated by processor 200 from the filtered proximity measurement data received, for example, from first proximity sensor 140 and second proximity sensor 142, as described above with respect to X-axis filtered waveform 306 and Y-axis filtered waveform 310. Direct orbit plot 312 and/or filtered orbit plot 314 also illustrate a profile or shape 318 of vibration within X-Y plane 150 and/or a direction 320 of vibration of component 102 as marker 316 is moved along plot 312 and/or 314. More specifically, in the exemplary embodiment, direct orbit plot 312 and/or filtered orbit plot 314 are oriented within display 300 to correspond to a reference plane (i.e., X-Y plane 150) of component 102 such that the amplitude, shape 318, and/or direction 320 of vibration illustrated in direct orbit plot 312 and/or filtered orbit plot 314 correspond to an amplitude, shape, and/or direction of vibration (not shown) of component 102.

Moreover, in the exemplary embodiment, each trace 302 includes a phase or rotation indicator 322 that visually or graphically identifies each instance in time that component 102 has completed a revolution. Phase indicator 322 corresponds to data received from rotation sensor 144 (shown in FIG. 2). More specifically, processor 200 calculates or determines a location of phase indicator 322 on each trace 302 by correlating data received from rotation sensor 144 with data received from at least one other sensor 134, such as first proximity sensor 140 and/or second proximity sensor 142. Phase indicator 322 provides an absolute phase reference, with respect to each revolution of component 102, for each trace 302 and may be used to identify a relative phase difference between traces 302.

In the exemplary embodiment, processor 200 and/or presentation interface 204 displays other component property values and/or other values related to component 102 and/or rotating device 100 on display 300. Such values may include, but are not limited to only including, a rotational frequency and/or a rotational speed (in revolutions per minute or in another unit of measurement) of component 102 and/or rotating device 100, the relative phase, the absolute phase, and/or the vibration amplitude and/or position of component 102 at marker 316. More specifically, when each marker 316 is displayed or positioned at a location along each trace 302, processor 200 accesses memory device 202 to receive the component property value or values corresponding to the time value of each marker location. Processor 200 and/or presentation interface 204 displays the component property value or values corresponding to the location of each marker 316 on display 300.

During operation, in the exemplary embodiment, processor 200 and/or presentation interface 204 displays a plurality of traces 302 to user 206 via display 300. User 206, in the exemplary embodiment, may cause marker 316 to be displayed at a first location on at least one trace 302, for example, by manipulating a selector and/or a portion (neither shown) of input interface 208 to generate a first user input signal. In the exemplary embodiment, a marker 316 is displayed at a second location along at least one other trace 302 (or along each other each trace 302) within display 300 based on the first user input signal, and each marker 316 and/or location is synchronized with each other marker 316 and/or location. Each location along each trace 302 corresponds to a time value and a component property value at that time value. More specifically, a first marker 316 is positioned at a desired location on a first trace 302 based on user input, for example. Each other marker 316 is positioned along a respective trace 302 at a location that corresponds to the same time value as the time value of first marker 316.

User 206 may also manipulate the selector and/or the portion of input interface 208 to cause marker 316 to be moved to a desired location on at least one trace 302, such as at least one time-based waveform and/or at least one orbit plot. Input interface 208 receives the user input and transmits a second user input signal representative of the user input to processor 200. In the exemplary embodiment, processor 200 calculates an offset value based on the second user input signal received from input interface 208. The offset value, in the exemplary embodiment, represents an amount of time to move marker 316 along trace 302.

In the exemplary embodiment, processor 200 calculates a new, or third location for marker 316 along trace 302 based on the offset value, and processor 200 and/or presentation interface 204 displays marker 316 at the new location. For example, if user 206 manipulates input interface 208 to select an increment of 10 milliseconds (ms) for marker 316, processor 200 and/or presentation interface 204 displays marker 316 at a location along trace 302 that corresponds to the previous time value of marker 316 plus 10 ms.

Processor 200, in the exemplary embodiment, calculates a fourth location for at least one other marker 316 (or for each other marker 316) along a respective trace 302 that corresponds to the new time value of first marker 316. In the exemplary embodiment, processor 200 and/or presentation interface 204 displays each other marker 316 at the calculated location along each trace 302. Accordingly, processor 200 and/or presentation interface 204 synchronizes traces 302 and/or markers 316 with each other such that user 206 may move a first marker 316 to a new time location on a first trace 302, and each other marker 316 on each other trace 302 is automatically updated to a new time location that corresponds to the new location of first marker 316.

Figure 5:
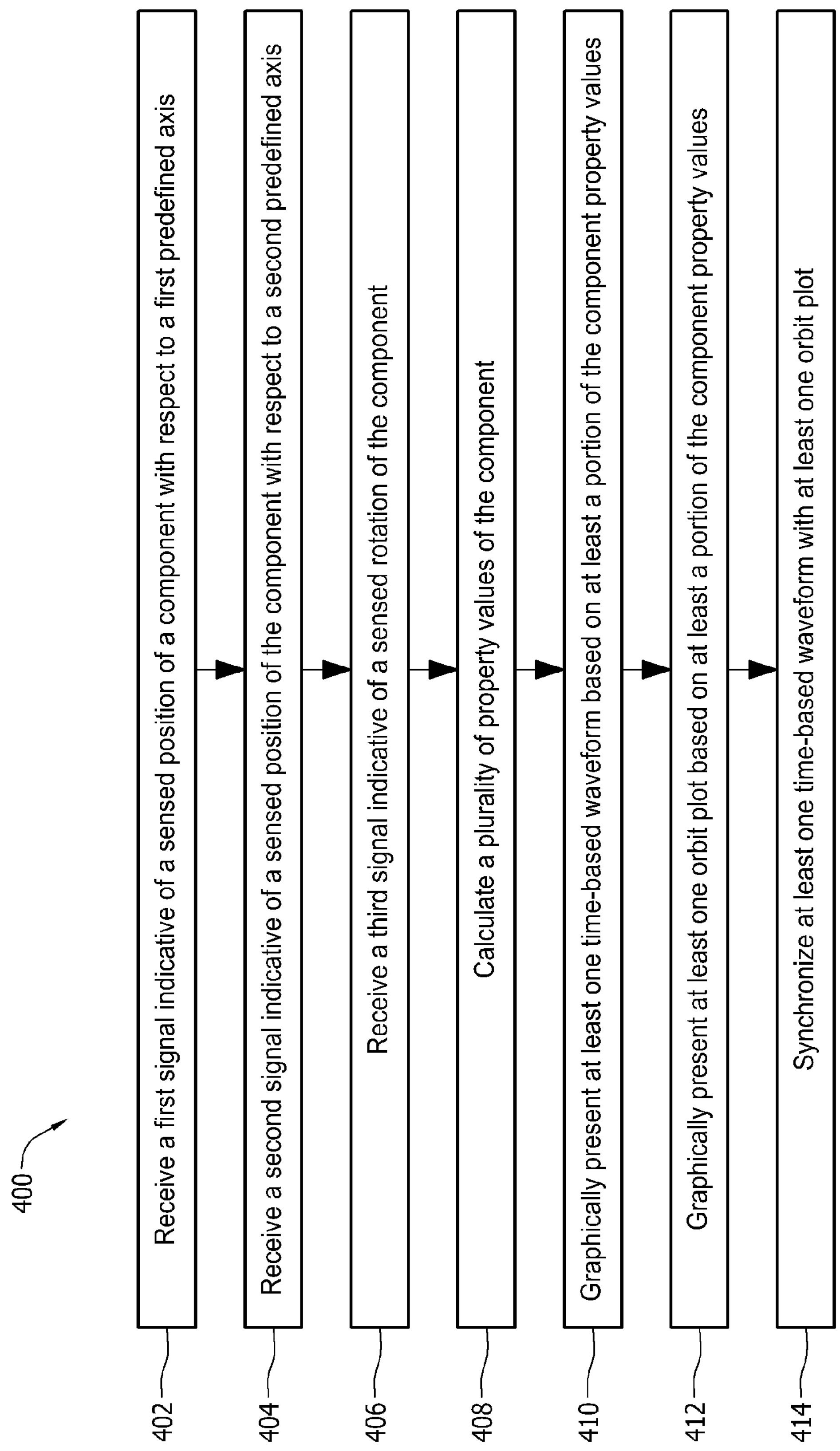
FIG. 5 is a flowchart of an exemplary method that may be used in monitoring an operation of the rotating device shown in FIG. 1.

FIG. 5 is a flowchart of an exemplary method 400 that may be used to monitor an operation of rotating device 100 (shown in FIG. 1) and/or component 102 (shown in FIG. 2). In the exemplary embodiment, method 400 is at least partially performed and/or executed by computing device 132 (shown in FIG. 1). For example, in the exemplary embodiment, a plurality of computer-executable instructions are embodied within a computer-readable medium, such as memory device 202. The instructions, when executed by a processor, such as processor 200, cause the processor to execute the steps of method 400 and/or to function as described herein.

In the exemplary embodiment, computing device 132 and/or processor 200 receives 402, from first proximity sensor 140 (shown in FIG. 2), a first signal that is indicative of a sensed position of component 102 with respect to a first predefined axis, such as X-axis 146 (shown in FIG. 2). Moreover, computing device 132 and/or processor 200 receives 404, from second proximity sensor 142 (shown in FIG. 2), a second signal that is indicative of a sensed position of component 102 with respect to a second predefined axis, such as Y-axis 148 (shown in FIG. 2). A third signal indicative of a sensed rotation of component 102 is received 406 by computing device 132 and/or processor 200 from rotation sensor 144 (shown in FIG. 2).

Processor 200, in the exemplary embodiment, calculates 408 a plurality of property values of component 102 based at least in part on the detected position of component 102 and/or based on the detected rotation of component 102. Processor 200 graphically presents, or displays 410, at least one time-based waveform that is indicative of a position of component 102 along a predefined axis to user 206 through presentation interface 204 (both shown in FIG. 3) and display 300 (shown in FIG. 4). For example, in the exemplary embodiment, processor 200 and/or presentation interface 204 graphically presents 410 X-axis direct waveform 304 and/or X-axis filtered waveform 306 that are indicative of the position of component 102 along X-axis 146, and/or graphically presents 410 Y-axis direct waveform 308 and/or Y-axis filtered waveform 310 (each shown in FIG. 4) that are indicative of the position of component 102 along Y-axis 148. In the exemplary embodiment, the time-based waveform is based on, or is generated from, at least a portion of the calculated plurality of component property values.

Moreover, in the exemplary embodiment, processor 200 graphically presents, or displays 412, at least one orbit plot that is indicative of a position of component 102 within a predefined reference plane, such as X-Y plane 150 to user 206 through presentation interface 204 and display 300. For example, in the exemplary embodiment, processor 200 and/or presentation interface 204 graphically presents 412 direct orbit plot 312 and/or filtered orbit plot 314 that are indicative of the position of component 102 within X-Y plane 150. In the exemplary embodiment, the orbit plot is based on, or is generated from, at least a portion of the calculated plurality of component property values. Moreover, processor 200 and/or presentation interface 204 synchronizes 414 at least one time-based waveform with at least one orbit plot. More specifically, in the exemplary embodiment, each time-based waveform and each orbit plot is synchronized 414 with each other.

An exemplary technical effect of the methods, systems, and apparatus described herein includes at least one of (a) receiving a signal indicative of a sensed position of a component with respect to a predefined axis; (b) calculating a plurality of property values of a component based at least in part on a sensed position of the component; (c) graphically presenting at least one time-based waveform based on at least a portion of a plurality of component property values, wherein the at least one time-based waveform is indicative of a position of a component along a predefined axis; (d) graphically presenting at least one orbit plot based on at least a portion of a plurality of component property values, wherein the at least one orbit plot is indicative of a position of a component within a predefined plane; and (e) synchronizing at least one time-based waveform with at least one orbit plot.

As described herein, a monitoring system is provided that includes a plurality of sensors that sense or detect a position of a component of a rotating device. The sensors transmit measurement signals to a computing device that calculates a plurality of component property values from the signals. The computing device includes a processor and a presentation interface that display at least a portion of the component property values to a user via a display. The component property values are displayed in a plurality of time-based waveforms and a plurality of orbit plots. The processor synchronizes the waveforms and plots such that markers displayed on each waveform and on each plot are positioned at the same location in time relative to all waveforms and plots. If a user causes one marker to be moved to a new location along a waveform or a plot, the processor automatically causes each other marker to be moved to a corresponding location along each other waveform and/or plot such that each marker in each respective waveform and plot is positioned at the same location in time relative to all other waveforms and plots. Accordingly, a user and/or a technician may quickly view a plurality of synchronized component values, waveforms, and/or plots for a component of a rotating device in one display to facilitate determining an operating condition of the component and/or rotating device.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems, apparatus, and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention may be practiced with modification within the spirit and scope of the claims.

What is claimed is:

1. A system for use in monitoring operation of a rotating device, the system comprising:

at least one sensor configured to sense a position of a component coupled to the rotating device with respect to a predefined axis, and to generate a signal indicative of the position of the component; and a processor coupled to the at least one sensor, the processor programmed to:

calculate a plurality of property values of the component based at least in part on the position;

graphically present at least one time-based waveform based on at least a portion of the plurality of component property values, wherein the at least one time-based waveform is indicative of a position of the component along the predefined axis;

graphically present at least one orbit plot based on at least a portion of the plurality of component property values, wherein the at least one orbit plot is indicative of a position of the component within a predefined plane; and synchronize the at least one time-based waveform with the at least one orbit plot.

2. The system in accordance with claim 1, further comprising an input interface configured to receive a user input and to generate a signal indicative of the user input, the processor is further programmed to graphically present a first marker on the at least one time-based waveform and to graphically present a second marker on the at least one orbit plot in response to the user input signal.

3. The system in accordance with claim 2, wherein, in response to a user input, the processor is programmed to move the first marker along the at least one time-based waveform and to move the second marker along the at least one orbit plot synchronously with respect to the first marker.

4. The system in accordance with claim 2, wherein, in response to a user input, the processor calculates a location for the first marker to be displayed on the at least one time-based waveform.

5. The system in accordance with claim 4, wherein, in response to the user input, the processor calculates a location for the second marker to be displayed on the at least one orbit plot, wherein the location for the second marker at least partially corresponds to the location for the first marker.

6. The system in accordance with claim 1, wherein the at least one sensor comprises a first sensor configured to sense a position of the component along a predefined X-axis and a second sensor configured to sense a position of the component along a predefined Y-axis.

7. The system in accordance with claim 6, wherein the at least one sensor further comprises a third sensor configured to sense a rotation of the component.

8. The system in accordance with claim 7, wherein the processor calculates the plurality of component property values based on the position and the rotation of the component.

9. The system in accordance with claim 8, wherein the sensors are synchronously sampled such that a sample from each sensor occurs at substantially the same time.

10. The system in accordance with claim 6, wherein the predefined X-axis and the predefined Y-axis are perpendicular to each other.

11. The system in accordance with claim 1, further comprising a memory device coupled to the processor, wherein the plurality of component property values are stored the memory device.

12. The system in accordance with claim 11, wherein the processor graphically presents at least one time-based waveform and at least one orbit plot based on the plurality of component property values stored in the memory device.

13. The system in accordance with claim 12, wherein the plurality of component property values is processed by a filter.

14. The system in accordance with claim 1, wherein the orbit plot graphically displays illustrated values of at least one component property, and wherein the illustrated values comprise an amplitude or a shape of vibration with respect to a plane and with respect to a period of revolution of the component.

15. The system in accordance with claim 1, wherein the orbit plots include a direct orbit plot or a filtered orbit plot.

16. A non-transitory computer-readable storage medium having computer executable instructions embodied thereon, wherein when executed by a processor, the computer-executable instructions cause the processor to:

receive a signal indicative of a position of a component coupled to a rotating device with respect to a predefined axis;

calculate a plurality of property values of the component based at least in part on the position;

graphically present at least one time-based waveform based on at least a portion of the plurality of component property values, wherein the at least one time-based waveform is indicative of a position of the component along the predefined axis;

graphically present at least one orbit plot based on at least a portion of the plurality of component property values, wherein the at least one orbit plot is indicative of a position of the component within a predefined plane; and synchronize the at least one time-based waveform with the at least one orbit plot.

17. The non-transitory computer-readable storage medium in accordance with claim 16, wherein when executed by the processor, the computer-executable instructions further cause the processor to:

receive a user input signal;

graphically present a first marker on the at least one time-based waveform in response to the user input signal; and graphically present a second marker on the at least one orbit plot in response to the user input signal.

18. The non-transitory computer-readable storage medium in accordance with claim 17, wherein when executed by the processor, the computer-executable instructions further cause the processor to:

graphically present the first marker at a first location along the at least one time-based waveform; and graphically present the second marker at a second location along the at least one orbit plot, wherein the second location is synchronized with respect to the first location.

19. The non-transitory computer-readable storage medium in accordance with claim 18, wherein when executed by the processor, the computer-executable instructions further cause the processor to:

receive a second user input signal;

calculate a third location for the first marker to be displayed on the at least one time-based waveform based on the second user input signal.

20. The non-transitory computer-readable storage medium in accordance with claim 19, wherein when executed by the processor, the computer-executable instructions further cause the processor to:

calculate a fourth location for the second marker to be displayed on the at least one orbit plot based on the second user input signal, wherein the fourth location at least partially corresponds to the third location.

21. A method of monitoring operation of a rotating device including a component, the method comprising:

receiving a signal indicative of a position of the component with respect to a predefined axis;

calculating a plurality of property values of the component based at least in part on the position;

graphically presenting at least one time-based waveform based on at least a portion of the plurality of component property values, wherein the at least one time-based waveform is indicative of a position of the component along the predefined axis;

graphically presenting at least one orbit plot based on at least a portion of the plurality of component property values, wherein the at least one orbit plot is indicative of a position of the component within a predefined plane; and synchronizing the at least one time-based waveform with the at least one orbit plot.

22. The method in accordance with claim 21, further comprising:

receiving a user input signal;

graphically presenting a first marker on the at least one time-based waveform in response to the user input signal; and graphically presenting a second marker on the at least one orbit plot in response to the user input signal.

23. The method in accordance with claim 22, further comprising:

graphically presenting the first marker at a first location along the at least one time-based waveform; and graphically presenting the second marker at a second location along the at least one orbit plot, wherein the second location is synchronized with respect to the first location.

24. The method in accordance with claim 23, further comprising:

receiving a second user input signal; and calculating a third location for the first marker to be displayed on the at least one time-based waveform based on the second user input signal.

25. The method in accordance with claim 24, further comprising calculating a fourth location for the second marker to be displayed on the at least one orbit plot based on the second user input signal, wherein the fourth location at least partially corresponds to the third location.

* * * * *